US012723001B2

(12) United States Patent
Feiss

(10) Patent No.: US 12,723,001 B2
(45) Date of Patent: Sep. 1, 2026

(54) MULTI-STAGE CLAY CALCINATION METHOD FOR CONTROLLING PRODUCT COLOR

(71) Applicant: KHD HUMBOLDT WEDAG GMBH, Cologne (DE)

(72) Inventor: Marc Feiss, Cologne (DE)

(73) Assignee: KHD Humboldt Wedag GmbH, Cologne (DE)

( * ) Notice: Subject to any disclaimer, the term of this patent is extended or adjusted under 35 U.S.C. 154(b) by 475 days.

(21) Appl. No.: 18/247,805

(22) PCT Filed: Oct. 5, 2021

(86) PCT No.: PCT/EP2021/077335
§ 371 (c)(1),
(2) Date: Apr. 4, 2023

(87) PCT Pub. No.: WO2022/073953
PCT Pub. Date: Apr. 14, 2022

(65) Prior Publication Data

US 2023/0373853 A1 Nov. 23, 2023

(30) Foreign Application Priority Data

Oct. 5, 2020 (DE) ......................... 102020126001.6

(51) Int. Cl.
*C04B 7/44* (2006.01)
*C04B 7/43* (2006.01)
*C04B 7/47* (2006.01)

(52) U.S. Cl.
CPC ............ *C04B 7/4476* (2013.01); *C04B 7/432* (2013.01); *C04B 7/475* (2013.01)

(58) Field of Classification Search
CPC ....... C04B 7/4476; C04B 7/432; C04B 7/475; C04B 7/43; C04B 7/47; C04B 14/10; Y02P 40/18
See application file for complete search history.

(56) References Cited

U.S. PATENT DOCUMENTS

2012/0145042 A1* 6/2012 Ballan .................. F27B 7/2033 432/103

FOREIGN PATENT DOCUMENTS

| | | |
|---|---|---|
| DE | 102014116373 A1 | 5/2016 |
| DE | 102015106417 A1 | 10/2016 |
| DE | 102016005285 B3 | 8/2017 |

OTHER PUBLICATIONS

International Search Report for International Patent Application No. PCT/EP2021/077335 dated Jan. 20, 2022; priority document.

(Continued)

*Primary Examiner* — Pamela H Weiss
(74) *Attorney, Agent, or Firm* — Greer, Burns & Crain, Ltd.

(57) ABSTRACT

A method for the thermal treatment of clays by: preheating the clay, which is suspended in a carrier gas, in a heat exchanger; thermally treating the clay in a calcination stage operated under chemically oxidizing conditions; subsequently thermally treating the clay in a calcination stage operated under chemically reducing conditions; cooling the clay in a cooling stage operated under chemically reducing conditions; cooling the clay in a cooling stage operating under chemically oxidizing conditions.

10 Claims, 2 Drawing Sheets

(56) References Cited

OTHER PUBLICATIONS

F. Martirena et al., "Color Control in Industrial Clay Calcination" RILEM Technical Letters (2020) 5: 1-7, Universidad Central, Universidad de Moa Cuba, Ecole Polytecnique Federal de Lausanne, EPFL, Switzerland, http://dx.doi.org/10.21809/rilemtechlett.2020.107, Jun. 29, 2020.

* cited by examiner

100
Waste air
133
132
130
110
131
140
141
120
109
151
Raw material
111
112
113
121
B
103
150
152
114
104
105
108
160 ox.
106
105'
115
193
B
123
Waste product
170 red.
122
191
B
181
107
180 red.
Activated clay
190 ox.
192
Input air
182
101
102
gaseous
solid 200
Waste air
133
132
130
110
131
140
141
109
120
151
Raw
material
111
112
113
121
103
150
152
114
104
105
108
160
ox.
106
115
105'
193
B
170
red.
123
Waste product
122
191
B
181
107
180
red.
Activated
clay
190
ox.
192
282
Input air
101
202
gaseous
solid

MULTI-STAGE CLAY CALCINATION METHOD FOR CONTROLLING PRODUCT COLOR

RELATED APPLICATIONS

This application is a national phase of International Patent Application No. PCT/EP2021/077335, filed on Oct. 5, 2021, which claims priority to German Patent Application No. 10 2020 126 001.6 file on Oct. 5, 2020.

FIELD OF THE INVENTION

The invention relates to a method of thermal treatment of clays.

BACKGROUND

Cement clinker, a composition of calcium silicates with different stoichiometry, is a current building material as starting material for high-performance concrete. In the production of cement clinker, $CO_2$, in a formal sense, is driven out of naturally occurring lime via a thermal treatment, which is associated with the production of cement clinker with high emission of $CO_2$. In the current expectation of a greenhouse effect on account of an excessively high $CO_2$ concentration in the Earth's atmosphere, efforts are being made to switch to substitute building materials that are less $CO_2$-intensive. Calcined clays are increasingly being used as a substitute building material for cement clinker. Although these do not have the strength of a high-performance concrete based on cement clinker, they are suitable for a multitude of building applications that do not place such high demands on the strength of the building material. Activated, i.e. calcined, clays are also suitable as a concrete admixture. Partial replacement of the building material is associated with a reduction in the emission of $CO_2$ based on the amount of building material produced.

Activated clay is produced by chemical/thermal activation of clay deposits in trenches. Clay is a naturally occurring material that consists mainly of fine-grain minerals, is generally plastically deformable with sufficient water contents, and becomes brittle when dried or fired. Even though clay generally contains sheet silicates, it may contain other materials that impart plasticity to it and harden when it is dried or fired. Associated phases that may be present in clay are materials that do not impart plasticity to it, for example quartz, calcite, dolomite, feldspar and organic substances. The definition of clays is not standardized. However, clay particles are considered in geological sciences to be those in accordance with standard EN ISO 14688, particles that are smaller than 2 μm, in some cases even smaller than 4 μm, and in colloid chemistry clay particles are considered to be those particles smaller than 1 μm. The main clays that are to be discussed in the context of this patent application are kaolinites, illites and montmorillonites having the aforementioned properties. For these clays to affect the setting characteristics of concrete as an additive, or to be involved in the concrete as a binder, the clay, as mentioned at the outset, has to be chemically/thermally activated in order for it to react in the desired manner with burnt lime or with cement clinker.

Naturally occurring clays contain inorganic impurities, for example iron, titanium and manganese, which determine the color of the activated clay by variation of their oxidation state. The reddish-brown color of Italian terracotta tiles, but also the reddish-brown color of the adobe houses that are known in California, is attributable to the color of oxides of the aforementioned metals. Iron impurities in clay may take the form of structural iron, for example as part of the kaolinite structure or of the structure of additional minerals, and be present as free iron as oxides, hydroxides, carbonates and also as sulfides, this enumeration being non-exhaustive. Results of clay studies suggest a correlation of the degree of red color saturation of clay with the titanium and iron oxide content, which correlates directly with colorimetric parameters of the outward appearance of clay. Manganese turns brown on oxidation. What is called brownstone is a typical manganese oxide, which also imparts its color to the activated clay.

There are no reliable studies to date about the color of activated clay and the strength thereof. However, a modern building material is expected to be color-neutral and not to show any red color to red-brown color. It is in the course of industrial calcination or activation of clays under oxidizing conditions and subsequent cooling of the activated clays with atmospheric air that the undesired red color of the activated clays is established.

In the chemical/thermal activation of clays, structural water ($H_2O$) present in the clay in question is driven out by thermal treatment. This "dehydration" of the clay is also called "dehydroxylation", with different use of the terms "dehydration" and "dehydroxylation" in chemistry and in the cement industry. The dehydroxylation of clays generally takes place within a temperature window between 650° C. and 800° C., and the optimal temperature window depends on the water content in the clay and the presence of accompanying materials in the clay.

On account of the similar process regime between the clay activation and the calcination of raw meal in the production of cement clinker, there is overlap in the specialist literature between the terms "calcination", "activation" and "dehydroxylation". In the context of this patent application, "activation" shall mean the chemical/thermal activation of clay.

German patent DE 10 2016 005 285 D3 discloses a method of activating clays. The activated clay produced by the method taught therein is suitable as concrete admixture. However, no specific measures for color control are employed.

German published specification DE 10 2014 116 373 A1 discloses a method of heat treatment of natural clays and/or zeolites. According to the concept presented therein, the calcination, i.e. the heat treatment of the clay and/or of zeolite, should be conducted under reducing conditions. This should convert trivalent iron, Fe(III), the compounds of which show a reddish-brown color, to divalent iron, Fe(II), the compounds of which have a black appearance. In the cooling of the activated clay as well, it is ensured that reducing or at least oxygen-free conditions exist. The reducing or oxygen-free process regime is not very easy to control without further measures in the cooling region without formation of unwanted emissions.

German published specification DE 10 2015 106 417 A1 refines the method of the aforementioned DE 10 2014 116 373 A1 with measures to keep the waste air clean. For this purpose, a constriction inserted in the calcination reactor leads to a different flow rate of the clay suspension and enables isolation of the still-hot clay from the gas in the calcination reactor. The reducing waste air from the calcination reactor is then freed by oxidation of the reducing gases, especially CO, but without oxidatively entraining the clay. The constriction is intended to ensure intensive mixing of the reducing calciner gas and introduced oxidizing agent. The oxidizing agent may be metered in so as to be just insufficient to oxidize the material again. But the separation of material and gas is effected in the connected cyclone separator. This mode of operation requires exact dosage of the oxidizing agent since, firstly, CO is to be oxidized completely, in order to avoid emissions, and it is secondly necessary to avoid reoxidation of the clay itself. The separation of the calcination gas from the suspended but still-hot clay requires very good balancing of the flow and pressure conditions in the calcination reactor, which is not entirely straightforward when secondary fuels having nonuniform ignition characteristics are used.

It is an object of the invention to provide a stable and efficiently controllable method of activating clays, in which the unwanted red color on account of the oxidation of iron and titanium constituents, and possibly of the further metallic accompanying substances, for example manganese, does not occur.

SUMMARY

The object of the invention is achieved by a method having the features according to one or more embodiments described herein. Further advantageous configurations are stated in additional embodiments described herein.

The concept of the invention accordingly envisages that two successive activation and cooling steps that are conducted under chemically reducing conditions are bounded on either side by activation and cooling steps that are conducted under chemically oxidizing conditions. The resultant alternating arrangement of chemically reducing and chemically oxidizing steps firstly makes it possible to obtain gray to black clay rather than reddish-brown-colored clay. On the other hand, the stoichiometrically reducing process gases are oxidized in the oxidizing method stages to such an extent that they can be released into the environment as emission gases without any problem. The process regime presented here, or the method, can be operated in a stable manner, such that gray to black clay is reliably obtainable, and the offgas values are also acceptable and do not include any unwanted emissions, such as carbon black or carbon monoxide.

In a specific configuration of the method, it may be the case that a cyclone heat exchanger is used to preheat the clay in the waste air from the calcination stage conducted under chemically oxidative conditions.

In addition, it may be the case that waste air from the heat exchanger is introduced into the cooling stage conducted under chemically reductive conditions.

It may also be the case that waste air from an air circulation drying plant for preparation of the clay is introduced into the cooling stage conducted under chemically reductive conditions.

In a specific configuration of the method, it may be the case that the offgases from the calcination stage conducted under chemically reducing conditions are oxidized in the calcination stage conducted under chemically oxidizing conditions.

In order to stabilize the gray to black color of the clay by formation of mainly iron(II) compounds, cooling of the clay in the cooler operated under reducing conditions to a temperature below 250° C. may be envisaged.

In an advantageous manner, the activation of the clay takes place under thermal treatment of the clay in the calcination stages at a temperature between 350° C. and 1050° C., preferably within a temperature interval between 600° C. and 950° C.

The chemically reducing conditions are preferably obtained by generating a reducing environment in the chemically reducing calciner by introduction of fuel in a superstoichiometric amount in relation to the oxygen present.

In order to conduct the method in a very simple and inexpensive manner, the method may be characterized by cooling of the clay in an entrained flow cooler, in a fluidized bed or in a moving bed, as opposed to known grid coolers, the operation of which is more complex.

DESCRIPTION OF THE DRAWINGS

The invention is illustrated in detail by the figures that follow. The figures show.

DETAILED DESCRIPTION

Figure 1:
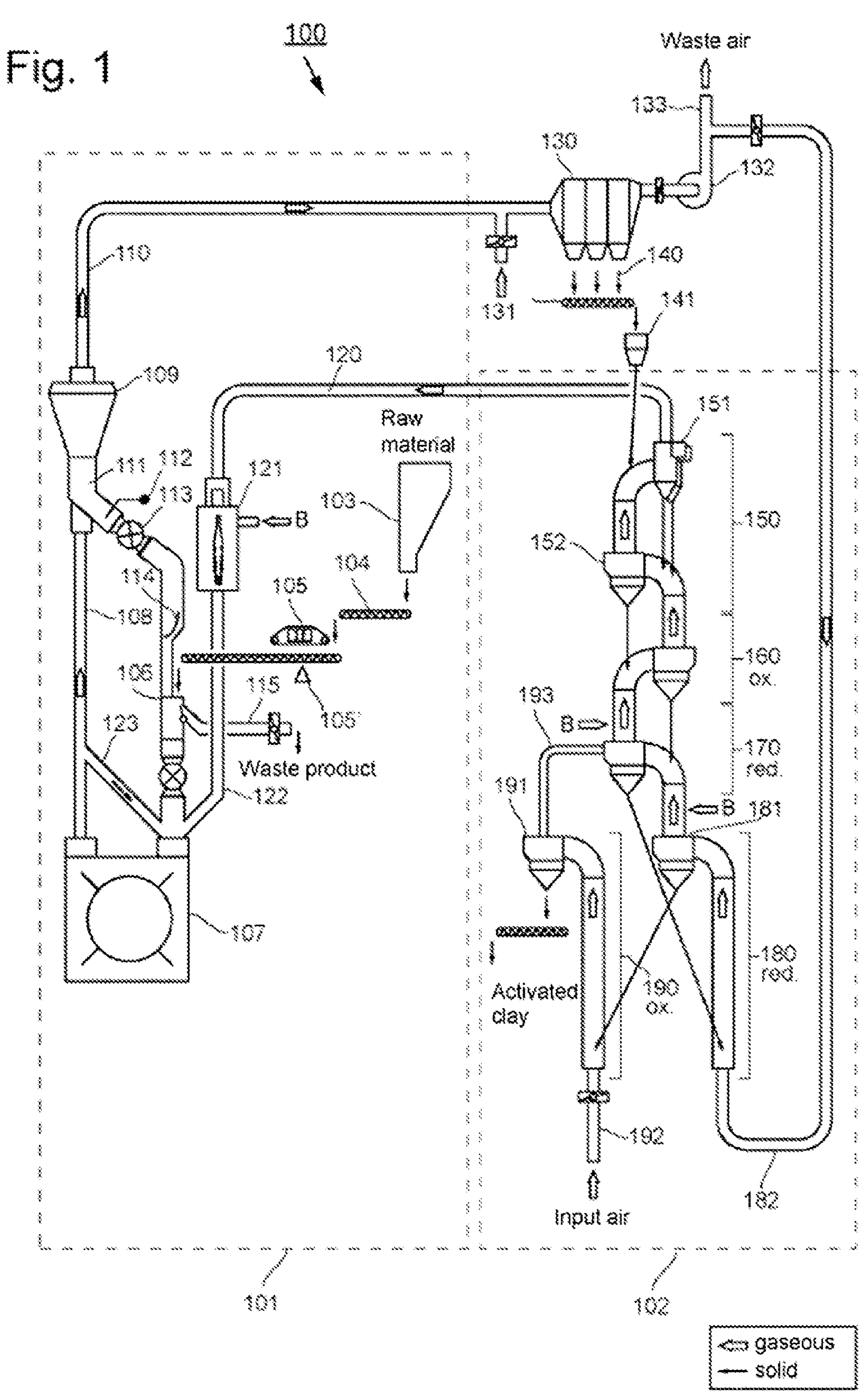
FIG. 1 a plant for activation of gray to black clay in a first embodiment, implementing a first method variant, FIG. 2 a plant for activation of gray to black clay in a second embodiment, implementing a second method variant.

FIG. 1 shows a plant 100 for activation of black to gray clay with which the method of the invention can be performed in a first variant. The plant 100 consists of a preparation plant 101 and a thermal line 102. What is essential to the invention for this present method is the construction of the thermal line 102 and the process regime that follows therefrom. Raw material from an application bunker 103 is placed onto a conveying device 104. This conveys the raw clay to a magnetic separator 105 and to a metering balance 105', in order to control the feed of raw clay. After passing through the magnetic separator 105, the raw clay is conveyed into an application apparatus 106, where it drops down to a hammer crusher 107 and is comminuted there. There is a flow of air/offgas through the hammer crusher 107. The comminuted material is conveyed pneumatically through a riser conduit 108 upward to a cyclone sifter 109, where the fine material in the comminuted raw clay is separated from the coarse material. The fine material continues to rise through a fines conduit 110. The coarse material 111 which is separated out of the cyclone sifter 109 falls through a corresponding conduit with a pendulum flap 112 via a star feeder 113 back into the application apparatus 106. Before that, however, the coarse material 111 passes through a mass flow sensor 114 for control of the raw clay supply. The application apparatus 106 is connected to an emptying conduit 115 through which the preparation plant 101 can be emptied. Drying air 120 flows into the preparation plant 101, and is heated further by means of an afterburner 121 and supply of fuel B. This turns the drying air 120 into hot air 122, which then flows into the hammer crusher 107, where the hot air 122 dries the raw clay as it is being crushed. Between the riser conduit 108 and the hot air conduit, there is also a pressure equalization conduit 123. The fines exiting from the cyclone sifter, which leave the cyclone sifter via the fines conduit 110, flow onward to a filter device, where the dry and comminuted raw clay 140 is filtered out. This leaves air, which is discarded as waste air via a ventilator 132 beyond the filter device 130 and is at least partly guided into the thermal line 102. The raw clay 140 is then guided into an application apparatus 141, where the raw clay 140 passes into the preheating stage 150. In the preheating stage 150, there are two heat exchanger cyclones 151 and 152, through which the offgases from the downstream calcination stages 160 and 170 flow. After passing through the heat exchanger cyclones 151 and 152, the raw clay has been heated and enters the chemically oxidatively operated calcination stage 160. The clay heats up very rapidly therein. Water is driven out of the clay, such that the clay is demoisturized. This can also form the iron(III) present in the clay, Fe(III), which leads to a reddish-brown color. In order to prevent the red color before it is manifested in the clay, the oxidatively operated calcination stage 160 is followed straight away by a reductively operated calcination stage 170. The incoming clay is already heated and predried. The red to brown color of the clay forms only when it is completely dry. In the method presented here, however, black to gray clay is formed at this point because it is only in the oxidatively operated calcination stage that the clay is fully demoisturized, and so the solid-state reaction sets in here in the iron (Fe), titanium (Ti) and manganese (Mn). The oxidative and reductive conditions result from the different gas supply to the two calcination stages 160 and 170. The oxidatively operated calcination stage 160 receives air from an oxidatively operated cooler 190, which is operated with fresh air from the atmosphere. On the other hand, the chemically reductively operated calcination stage 170 works with waste air from the circulation grinding plant, namely preparation plant 101. The air flows here from the oxidatively operated cooler 190 via a conduit that guides cooler offgas 193 into the oxidatively operated calcination stage 160. The chemically reductively operated calcination stage 170 receives air from a reductively operated cooler 180, which is operated with waste air from the filter device 130 via a recycle conduit 182.

Clay in solid form leaves the chemically reductively operated calcination stage 170 via a solid conduit and drops into the chemically reductively operated cooler 180, in the form here of an entrained flow cooler. In the cooler 180, the clay is cooled rapidly to well below 600° C., and ascends in the cooler cyclone 181. Thence, the solids in the cooler cyclone 181 pass via a solids conduit into the chemically oxidatively operated cooler 190, which is operated with fresh air. The cooler cyclone 191 cools the clay to below 250° C. and separates the activated clay of black to gray appearance, such that the activated clay leaves the thermal line 102. The oxygen-rich offgas from the cooler 190 then rises via a conduit as cooler offgas 193 into the chemically oxidatively operated calcination stage 170. This process variant has the advantage that the filter offgas from the filter device 130 has a low temperature and also a low oxygen concentration. These conditions permit a reductive environment. No specific conditioning of the recycled gas is necessary.

Figure 2:
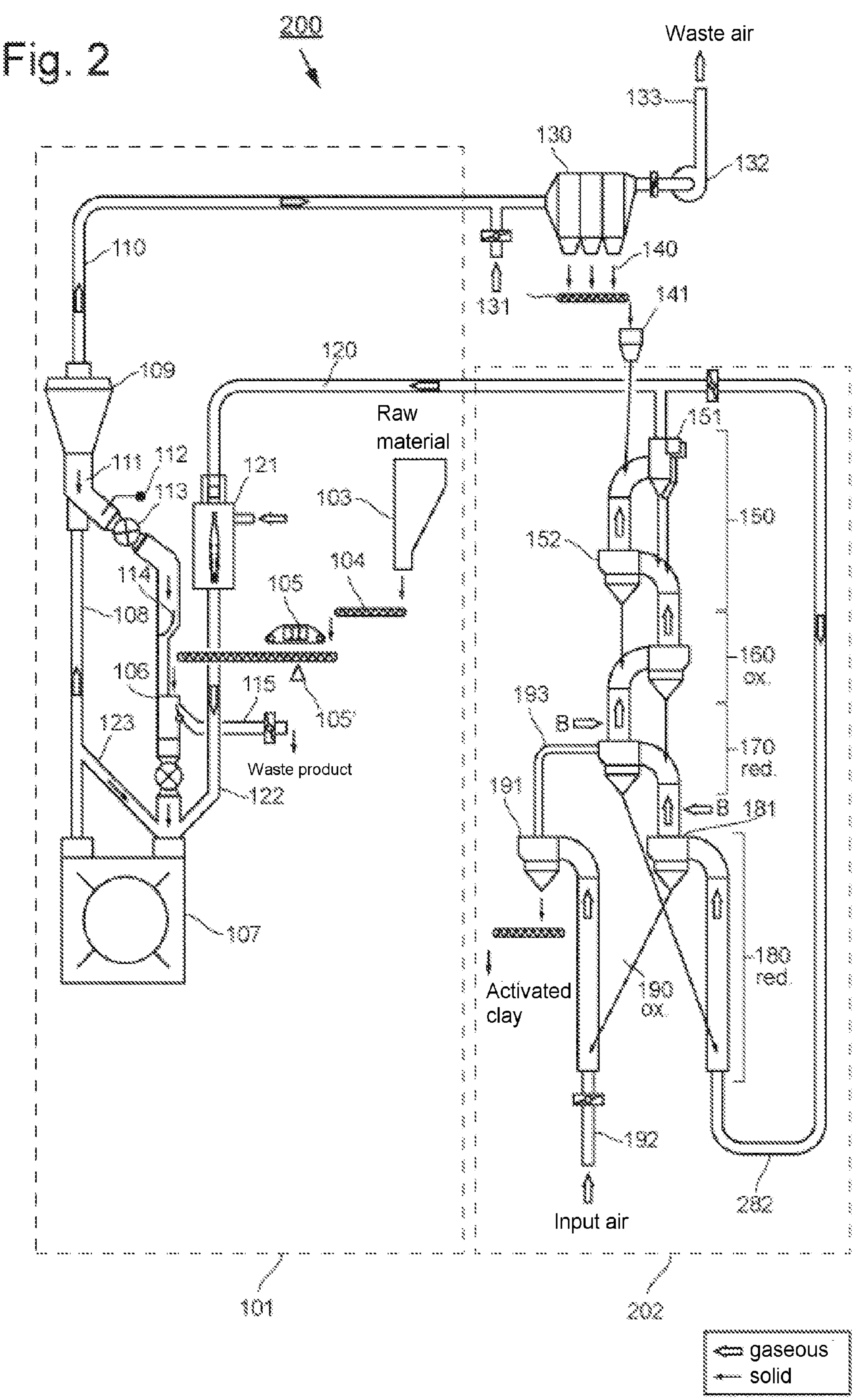

FIG. 2 shows a plant 200 for activation of black to gray clay, with which the method of the invention in a second variant can be performed. The plant shown here in FIG. 2 differs from the plant in FIG. 1 in the thermal line 202 around the recycle conduit 182. Here, in this embodiment of the plant 200, rather than the recycle conduit 182 in FIG. 1, a recycle conduit 282 from the outlet of the preheating stage 150 leads back into the chemically reductively operated cooler 180.

This process variant has the advantage that the heat exchanger offgas already has a low oxygen concentration. This is transported via a booster fan in the riser shaft to the oxidatively operated cooler 190. For conditioning of the offgases, heat or a combination thereof heat can be withdrawn from the gas with the aid of a water injection or the mixing-in of fresh air/preheated cooling air.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

100 Plant
101 Preparation plant
102 Thermal line
103 Application bunker
104 Conveying device
105 Magnetic separator
105' Metering balance
106 Application apparatus
107 Hammer crusher
108 Riser conduit
109 Cyclone sifter
110 Fines conduit
111 Coarse material
112 Pendulum flap
113 Star feeder
114 Mass flow sensor
115 Emptying conduit
120 Drying air
121 Afterburner
122 Hot air conduit
123 Pressure equalization conduit
130 Filter device
131 Fresh air feed
132 Ventilator
133 Waste air conduit
140 Raw clay
141 Application apparatus
150 Preheating stage
151 Heat exchanger cyclone
152 Heat exchanger cyclone
160 Calcination stage, oxidizing
170 Calcination stage, reducing
180 Cooler, reducing
181 Cooler cyclone
182 Recycle conduit
190 Cooler, oxidizing
191 Cooler cyclone
192 Fresh air feed
193 Cooler offgas

The invention claimed is:

1. A method for thermal treatment of clays, the method comprising:

preheating clay, in a heat exchanger, the clay suspended in a carrier gas, thermally treating the clay in a first calcination stage conducted under chemically oxidizing conditions, followed by thermally treating the clay in a second calcination stage conducted under chemically reducing conditions, wherein the second calcination stage is carried out in a dedicated reactor vessel that is separate from the first calcination stage and is configured for active fuel injection to generate reducing conditions within a high-temperature reaction zone at temperatures above 600° C.

cooling the clay in a first cooling stage conducted under chemically reducing conditions, and, cooling the clay in a second cooling stage conducted under chemically oxidizing conditions, such that a sequence of the method comprises an alternating redox profile of oxidizing, reducing, reducing, and oxidizing conditions.

2. The method as claimed in claim 1,
wherein
a cyclone heat exchanger is provided for preheating the clay in a waste air of the first calcination stage conducted under chemically oxidative conditions.

3. The method as claimed in claim 1
further comprising:
introducing waste air from the heat exchanger into the first cooling stage conducted under chemically reductive conditions.

4. The method as claimed in claim 1,
further comprising:
introducing waste air from an air circulation drying plant for preparation of the clay into the first cooling stage conducted under chemically reductive conditions.

5. The method as claimed in claim 1,
further comprising:
oxidizing offgases from the second calcination stage conducted under chemically reducing conditions in the first calcination stage conducted under chemically oxidizing conditions.

6. The method as claimed in claim 1,
further comprising:
cooling the clay in a cooler operated under reducing conditions to a temperature well below 600° C. in the first cooling stage, and then cooling the clay in a cooler operated under oxidative conditions to product temperature below 250° C. in the second cooling stage.

7. The method as claimed in claim 1,
further comprising:
thermally treating the clay in the first calcination stage at a temperature between 350° and 1050°.

8. The method as claimed in claim 1,
further comprising:
generating a reducing environment in a calciner operated under chemically reducing conditions in the second calcination stage by introducing fuel in a superstoichiometric amount in relation to oxygen present.

9. The method as claimed in claim 1,
wherein
the clay is cooled in an entrained flow cooler, in a fluidized bed, or in a moving bed.

10. The method as claimed in claim 1, further comprising:
thermally treating the clay in the first and second calcination stages at a temperature between 600° C. and 950°.

* * * * *